United States Patent
Hu (10) Patent No.: US 11,140,247 B2
(45) Date of Patent: Oct. 5, 2021

(54) UE, AND METHOD AND APPARATUS FOR IDENTIFYING HANDPRINT

(71) Applicant: BEIJING XIAOMI MOBILE SOFTWARE CO., LTD., Beijing (CN)

(72) Inventor: Xiankun Hu, Beijing (CN)

(73) Assignee: BEIJING XIAOMI MOBILE SOFTWARE CO, . LTD., Beijing (CN)

( * ) Notice: Subject to any disclaimer, the term of this patent is extended or adjusted under 35 U.S.C. 154(b) by 83 days.

(21) Appl. No.: 16/556,570

(22) Filed: Aug. 30, 2019

(65) Prior Publication Data

US 2020/0186628 A1  Jun. 11, 2020

(30) Foreign Application Priority Data

Dec. 11, 2018  (CN) .......................... 201811513393.0

(51) Int. Cl.
*H04M 1/02* (2006.01)
*G06K 9/00* (2006.01)
(Continued)

(52) U.S. Cl.
CPC .......... *H04M 1/026* (2013.01); *G06K 9/0002* (2013.01); *G06K 9/00087* (2013.01); *G06K 9/6215* (2013.01); *H04M 1/673* (2013.01)

(58) Field of Classification Search
CPC .... H04M 1/026; H04M 1/673; G06K 9/0002; G06K 9/00087; G06K 9/00375; G06K 9/6215; A61B 5/1171
See application file for complete search history.

(56) References Cited

U.S. PATENT DOCUMENTS

2005/0213799 A1* 9/2005 Sawano ............... G06K 9/0002
382/124
2017/0372122 A1* 12/2017 Shim .................. G06K 9/00087
(Continued)

FOREIGN PATENT DOCUMENTS

CN  106971148 A  7/2017
EP  3 264 815 A1  1/2018

OTHER PUBLICATIONS

Extended European Search Report dated Mar. 25, 2020, in Patent Application No. 19199630.5, 7 pages.

*Primary Examiner* — Edward F Urban
*Assistant Examiner* — Wassim Mahrouka
(74) *Attorney, Agent, or Firm* — Oblon, McClelland, Maier & Neustadt, L.L.P.

(57) ABSTRACT

The disclosure relates to a user equipment (UE) and a method and apparatus for identifying a handprint. The user equipment includes a housing including a front housing, a rear housing, and a middle frame located between the front housing and the rear housing; at least one ultrasound handprint sensor located on an inner wall of the middle frame, and configured to emit an ultrasound capable of passing through the middle frame, receive an ultrasound reflected by a hand of a user, and generate an electric signal of handprint information based on the ultrasound reflected by the hand of the user; and a controller located inside the housing, electrically connected to the at least one ultrasound handprint sensor, and configured to control the at least one ultrasound handprint sensor, and convert the electric signal of the handprint information collected by the at least one ultrasound handprint sensor into a handprint image.

11 Claims, 8 Drawing Sheets

(51) Int. Cl.
    *G06K 9/62*     (2006.01)
    *H04M 1/673*     (2006.01)

(56) References Cited

U.S. PATENT DOCUMENTS

| | | | |
|---|---|---|---|
| 2018/0101711 A1 | 4/2018 | D'Souza et al. | |
| 2019/0041912 A1* | 2/2019 | Ha | G06F 3/041 |
| 2019/0073505 A1* | 3/2019 | Kwon | G06K 9/0004 |
| 2019/0073507 A1 | 3/2019 | D'Souza et al. | |
| 2019/0244007 A1* | 8/2019 | Bach | G06K 9/00087 |

* cited by examiner

UE, AND METHOD AND APPARATUS FOR IDENTIFYING HANDPRINT

CROSS-REFERENCE TO RELATED APPLICATIONS

This application is based on and claims priority to Chinese Patent Application No. 201811513393.0, filed on Dec. 11, 2018, the entire contents of which are incorporated herein by reference.

TECHNICAL FIELD

The present disclosure relates to the field of user equipment (UE) technology, and in particular to a UE and a method and apparatus for identifying a handprint.

BACKGROUND

Handprint identification has become a standard on a flagship model of a mainstream mobile UE manufacturer. Handprint identification may serve not only to unlock and wake UE, etc., but also as a protective screen for data information inside the UE. With development of UE technology, there is an increasingly wide application of mobile secure payment implemented using handprint identification.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a user equipment. The user equipment includes a housing including a front housing, a rear housing, and a middle frame located between the front housing and the rear housing; at least one ultrasound handprint sensor located on an inner wall of the middle frame, and configured to emit an ultrasound capable of passing through the middle frame, receive an ultrasound reflected by a hand of a user, and generate an electric signal of handprint information based on the ultrasound reflected by the hand of the user; and a controller located inside the housing, electrically connected to the at least one ultrasound handprint sensor, and configured to control the at least one ultrasound handprint sensor, and convert the electric signal of the handprint information collected by the at least one ultrasound handprint sensor into a handprint image.

According to an aspect, the user equipment further includes at least one pressure sensor, in a one-to-one correspondence with the at least one ultrasound handprint sensor, located between a corresponding ultrasound handprint sensor and the middle frame, electrically connected to the controller, and configured to detect a pressure applied by the hand of the user on a side wall where the corresponding ultrasound handprint sensor is located, wherein the controller is further configured to control, in response to the pressure detected by the at least one pressure sensor exceeding a preset pressure threshold, the corresponding ultrasound handprint sensor corresponding to the at least one pressure sensor to acquire the electric signal of the handprint information.

In an example, the at least one ultrasound handprint sensor includes two ultrasound handprint sensors located respectively on two opposite inner walls of the middle frame.

According to an aspect, the user equipment further includes a flexible board connecting the controller to the at least one ultrasound handprint sensor, and connecting the at least one pressure sensor to the controller.

In an example, an outer wall of the middle frame includes an engraving that indicates an area where the at least one ultrasound handprint sensor acquires the electric signal of the handprint information.

In another example, the at least one ultrasound handprint sensor includes a film handprint sensor, wherein the inner wall of the middle frame includes a groove, and wherein the film handprint sensor is disposed inside the groove.

In another example, the at least one pressure sensor includes a film pressure sensor, wherein the inner wall of the middle frame includes a groove, wherein a film handprint sensor and the film pressure sensor are disposed inside the groove, and wherein the film pressure sensor is identical in size to the film handprint sensor.

Aspects of the disclosure also provide a method for identifying a handprint, applied to a user equipment. The method includes collecting a handprint image of a hand, the handprint image including at least one of a palm print image corresponding to a palm print of a palm or a fingerprint image corresponding to a fingerprint of a finger; comparing an image in the handprint image to a sample image in a pre-stored image library, the sample image in the pre-stored image library including at least one of a palm print image corresponding to a palm print of a palm or a fingerprint image corresponding to a fingerprint of a finger of a legitimate user; in response to determining a sample image with a similarity to the image in the handprint image exceeding a preset similarity threshold, determining, based on a pre-stored correspondence between a sample image and a hand part, a combination of hand parts corresponding to the image in the handprint image; and executing, based on a pre-stored correspondence between a combination of hand parts and a control instruction, a control instruction corresponding to the combination of hand parts corresponding to the image in the handprint image.

According to an aspect, when collecting the handprint image of the hand, the method further includes detecting, via a pressure sensor in the user equipment, a pressure applied by the hand of the user on a side wall where an ultrasound handprint sensor corresponding to the pressure sensor is located; in response to the pressure exceeding a preset pressure threshold, collecting, by the ultrasound handprint sensor, an electric signal of handprint information of the hand; and converting the electric signal of the handprint information into the handprint image.

Aspects of the disclosure also provide an apparatus for identifying a handprint, applied to a user equipment. The apparatus includes a processor and a memory for storing instructions executable by the processor. The processor is configured to collect a handprint image of a hand, the handprint image including at least one of a palm print image corresponding to a palm print of a palm or a fingerprint image corresponding to a fingerprint of a finger; compare an image in the handprint image to a sample image in a pre-stored image library, the sample image in the pre-stored image library including at least one of a palm print image corresponding to a palm print of a palm or a fingerprint image corresponding to a fingerprint of a finger of a legitimate user; in response to determining a sample image with a similarity to the image in the handprint image exceeding a preset similarity threshold, determine, based on a pre-stored correspondence between a sample image and a hand part, a combination of hand parts corresponding to the image in the handprint image; and execute, based on a pre-stored correspondence between a combination of hand parts and a control instruction, a control instruction corresponding to the combination of hand parts corresponding to the image in the handprint image.

Aspects of the disclosure also provide a non-transitory computer-readable storage medium having stored thereon instructions that, when executed by at least one processor, cause the at least one processor to implement a method for identifying a handprint, applied to a user equipment. The method includes collecting a handprint image of a hand, the handprint image including at least one of a palm print image corresponding to a palm print of a palm or a fingerprint image corresponding to a fingerprint of a finger; comparing an image in the handprint image to a sample image in a pre-stored image library, the sample image in the pre-stored image library including at least one of a palm print image corresponding to a palm print of a palm or a fingerprint image corresponding to a fingerprint of a finger of a legitimate user; in response to determining a sample image with a similarity to the image in the handprint image exceeding a preset similarity threshold, determining, based on a pre-stored correspondence between a sample image and a hand part, a combination of hand parts corresponding to the image in the handprint image; and executing, based on a pre-stored correspondence between a combination of hand parts and a control instruction, a control instruction corresponding to the combination of hand parts corresponding to the image in the handprint image.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

A term used in an aspect herein is merely for describing the aspect instead of limiting the subject disclosure. A singular form "a" and "the" used in an aspect herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an aspect herein to describe various kinds of information, such information should not be limited to such a term. Such a term is merely for distinguishing information of the same type. For example, without departing from the scope of the aspects herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of aspects herein. However, those skilled in the art will know that the technical solutions of aspects herein may be carried out without one or more of the details; alternatively, another method, component, device, step, etc. may be adopted. Under other conditions, no detail of a known structure, method, device, implementation, material or operation may be shown or described to avoid obscuring aspects of aspects herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

An existing fingerprint module arranged for identifying a fingerprint in general may be set at a bottom area of a front housing of UE. An opening may have to be made at the bottom area, to reveal a handprint collecting area of the handprint module, such that a user may input a handprint in the handprint collecting area. The opening in general may be large, increasing difficulty in manufacturing a housing, increasing a manufacturing cost. Plus, reveal of the handprint collecting area may not look good.

In view of this, at least one aspect herein provides UE. The UE may include a housing. The housing may include a front housing. The housing may include a rear housing. The housing may include a middle frame. The middle frame may be located between the front housing and the rear housing. The UE may include at least one ultrasound handprint sensor. The at least one ultrasound handprint sensor may be located on an inner wall of the middle frame. The at least one ultrasound handprint sensor may be arranged for emitting ultrasound capable of passing through the middle frame. The at least one ultrasound handprint sensor may be arranged for receiving ultrasound reflected by a hand of a user. The at least one ultrasound handprint sensor may be arranged for generating an electric signal of handprint information according to the ultrasound reflected. The UE may include a controller. The controller may be located inside the housing. The controller may be electrically connected to the at least one ultrasound handprint sensor. The controller may be arranged for controlling the at least one ultrasound handprint sensor. The controller may be arranged for converting the electric signal of the handprint information collected by the at least one ultrasound handprint sensor into a handprint image. As the UE can collect a handprint by ultrasound, no opening has to be made on the UE to reveal any handprint collecting area. Thus, such a handprint collecting module can be hidden completely inside the housing, improving integrity of UE design and overall look of the machine, reducing a number of openings, reducing cost and difficulty in manufacturing a housing.

Figure 1:
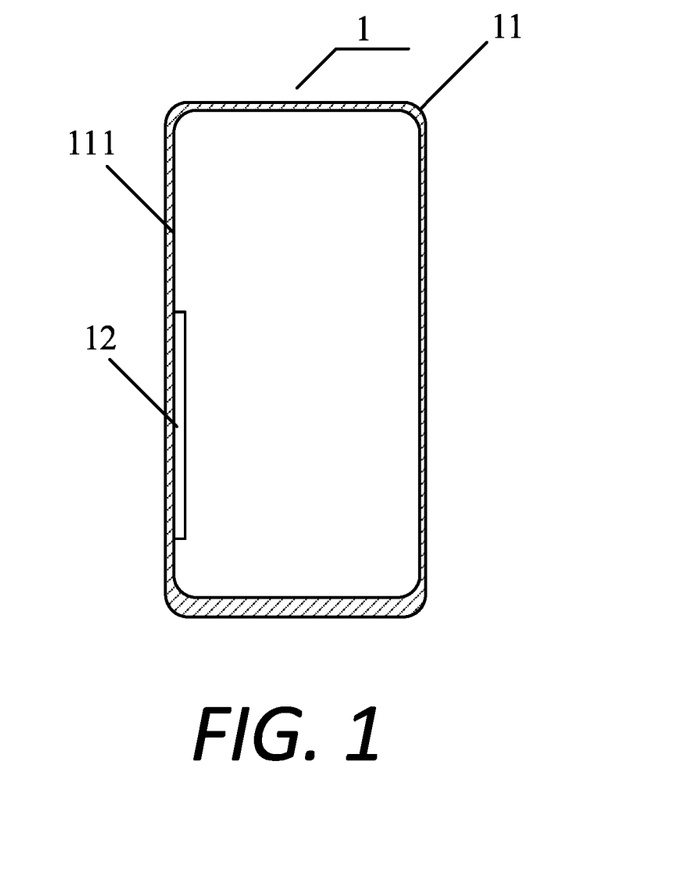
FIG. 1 is a diagram of a structure of UE according to an exemplary aspect of the present disclosure.

FIG. 1 is a diagram of a structure of UE according to an exemplary aspect. As shown in FIG. 1, the UE 1 may include a housing. The housing may include a front housing, a rear housing (not shown in the drawing), and a middle frame 11 located between the front housing and the rear housing. For example, the UE may be a mobile phone. The front housing may be a protective housing located on a display module of the UE. The rear housing may be a rear cover for a battery of the UE. The middle frame may be a rectangular frame surrounded by four side walls of the UE. The middle frame may connect edges of the rear housing and of the front housing. The middle frame may form, together with the front housing and the rear housing, the housing of the UE.

Figure 2:
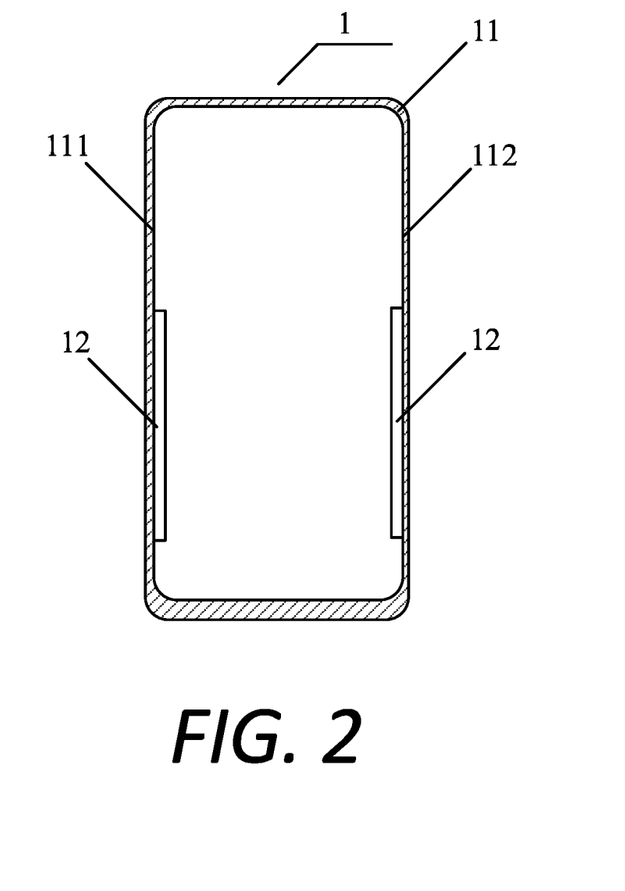
FIG. 2 is a diagram of a structure of UE according to an exemplary aspect of the present disclosure.

As shown in FIG. 1, the UE 1 may further include at least one ultrasound handprint sensor 12. The at least one ultrasound handprint sensor 12 may be located on an inner wall of the middle frame 11. The inner wall may refer to a side on the middle frame 11 that faces the interior of the UE. The middle frame on the UE in general may include four bars in a circle, such as a top bar located at the top of the UE, a bottom bar located at the bottom of the UE, and a left bar and a right bar located respectively on the left side and on the right side of the UE. For example, as shown in FIG. 1, the UE may include one ultrasound handprint sensor 12. The one ultrasound handprint sensor 12 may be located on the inner wall of the left bar 111 of the middle frame 11. For example, FIG. 2 is a diagram of a structure of UE according to an exemplary aspect. As shown in FIG. 2, the UE may include two ultrasound handprint sensors 12, one ultrasound handprint sensor 12 located on the inner wall of the left bar 111 of the middle frame 11, the other ultrasound handprint sensor 12 located on the inner wall of the right bar 112 of the middle frame 11. The ultrasound handprint sensor may as well be set on another bar of the middle frame 11, or on any available area on the middle frame, which is not limited here. An available area of the middle frame 11 may refer to an area on the middle frame other than where a button, various openings such as an opening for a microphone, a USB interface, etc., are set.

The UE 1 may further include a controller (not shown in the drawing). The controller may be located inside the housing of the UE. The controller may be electrically connected to the at least one ultrasound handprint sensor 101. The controller may be arranged for controlling the at least one ultrasound handprint sensor. For example, when a handprint image of a user is to be acquired to identify the user such as for unlocking, the controller may control the at least one ultrasound handprint sensor to emit ultrasound to acquire the electric signal of the handprint information, etc. The controller may convert the electric signal of the handprint information collected by the at least one ultrasound handprint sensor into a handprint image. Then, the user may be identified according to the handprint image, or different instructions may be executed according to different handprint images.

Here, as a handprint image may be acquired by ultrasound, no opening has to be made on the UE to reveal any handprint collecting area. Thus, such a handprint collecting module can be hidden completely inside the housing, improving integrity of UE design and overall look of the machine, reducing a number of openings, reducing cost and difficulty in manufacturing a housing.

Figure 3:
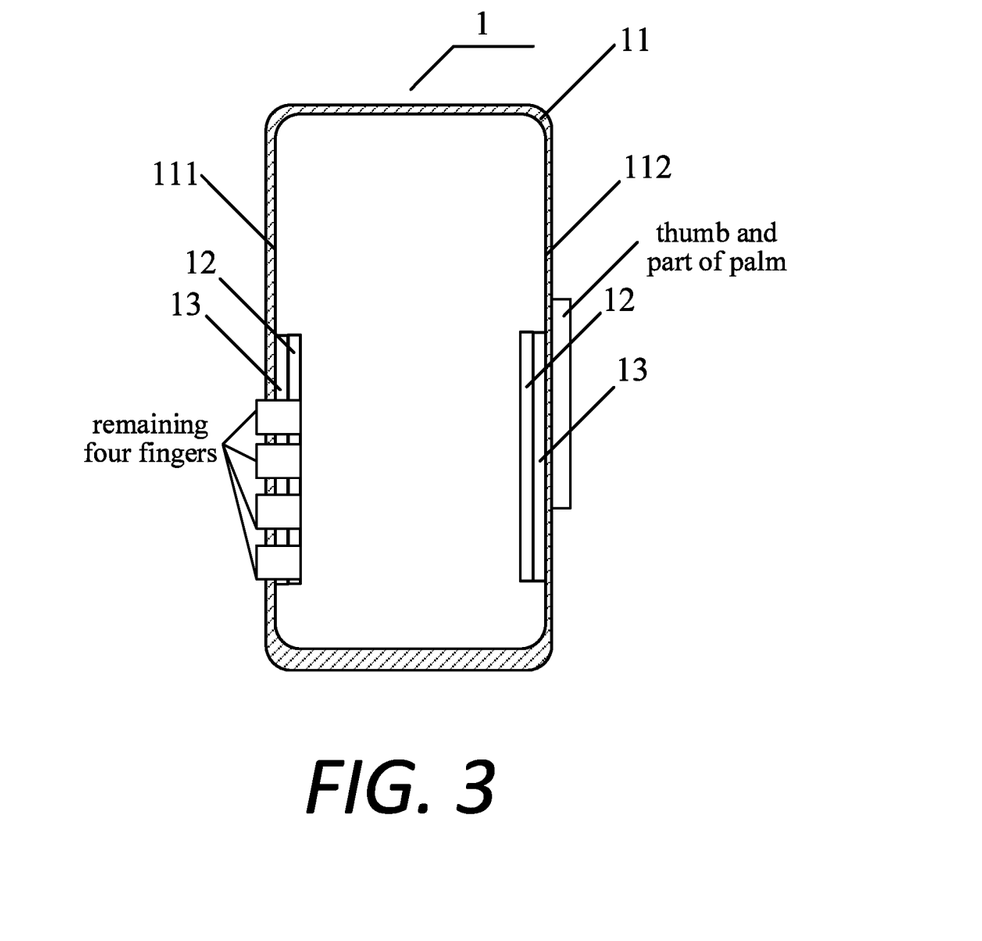
FIG. 3 is a diagram of a structure of UE according to an exemplary aspect of the present disclosure.

FIG. 3 is a diagram of a structure of UE according to an exemplary aspect. As shown in FIG. 3, the UE may further include at least one pressure sensor 13. As shown in FIG. 3, the at least one pressure sensor 13 may be in a one-to-one correspondence with the at least one ultrasound handprint sensor 12. The at least one pressure sensor may be located between a corresponding ultrasound handprint sensor 12 and the middle frame 11. The at least one pressure sensor may be electrically connected to the controller. The at least one pressure sensor 13 may be arranged for detecting a pressure applied by the hand of the user on a side wall where the corresponding ultrasound handprint sensor 12 is located. Thus, the controller may control, in response to the pressure detected by the at least one pressure sensor 13 exceeding a preset pressure threshold, the corresponding ultrasound handprint sensor 12 corresponding to the at least one pressure sensor 13 to acquire the electric signal of the handprint information. Accordingly, when a user is to input handprint information for unlocking, the user may apply a large force to a side wall where an ultrasound handprint sensor 12 is located. The controller may then control the ultrasound handprint sensor 12 to emit ultrasound to acquire the electric signal of the handprint information. This may prevent a user touch by accident, avoiding emitting ultrasound for acquiring the electric signal of the handprint information when the electric signal is not required.

For example, as shown in FIG. 3, if the pressure sensor 13 at the left bar 111 of the middle frame 11 has detected a pressure exceeding the preset pressure threshold, the controller may control the ultrasound the sensor 12 at the left bar 111 of the middle frame 11 to emit ultrasound for acquiring the electric signal of the handprint information.

Here, a pressure applied by a hand of a user on a side wall where an ultrasound handprint sensor corresponding to a pressure sensor is located may be detected by the pressure sensor. When the pressure detected by the pressure sensor exceeds a preset pressure threshold, the ultrasound handprint sensor corresponding to the pressure sensor can be controlled to acquire an electric signal of handprint information, preventing a user touch by accident.

As shown in FIG. 2 or FIG. 3, the UE may include two ultrasound handprint sensors 12. The two ultrasound handprint sensors 12 may be located respectively on two opposite inner walls of the middle frame 11.

For example, as shown in FIG. 3, two ultrasound handprint sensors 12 may be located respectively on two opposite inner walls of the middle frame 11. The user may hold the UE by hand. The thumb and part of the palm will be located on one side. The remaining four fingers will be located on the other side. Then, to acquire a handprint image, the controller may directly control an ultrasound handprint sensor to emit ultrasound for acquiring an electric signal of handprint information. The user may input handprint information while holding the UE, facilitating use of handheld UE by the user.

Here, two ultrasound handprint sensors may be included in UE. The two ultrasound handprint sensors may be located respectively on two opposite inner walls of the middle frame. Accordingly, the user may input handprint information while holding the UE, enhancing user experience greatly.

Figure 4:
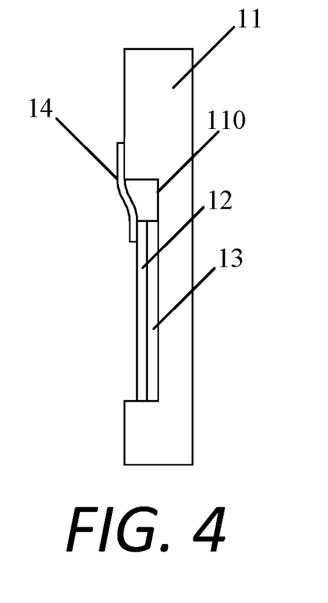
FIG. 4 is a diagram of a structure of UE according to an exemplary aspect of the present disclosure.

FIG. 4 is a diagram of a sectional structure of UE according to an exemplary aspect. As shown in FIG. 4, the UE may further include a flexible board 14. The flexible board 14 may connect the controller to the at least one ultrasound handprint sensor. The flexible board may connect the at least one pressure sensor to the controller.

Here, an ultrasound handprint sensor and the controller may be connected by a flexible board. A pressure sensor and the controller may as well be connected by a flexible board. As a flexible board is free to bend, coil, fold, etc., the flexible board may be arranged as required by a spatial layout inside UE, facilitating design of a control inside the UE.

An engraving may be set on an outer wall of the middle frame. The engraving may serve to indicate an area where the at least one ultrasound handprint sensor is to acquire an electric signal of handprint information.

The area where an ultrasound handprint sensor is to acquire an electric signal of handprint information may be an area on the outer wall on the other side of the inner wall covered by the ultrasound handprint sensor. For example, various engravings may be set on the area. A user may learn the area where to input handprint information by touching and feeling the engraving with hand. Or, an engraving may be set at the boundary of the area. Upon touching and feeling the engraving with hand, a user may learn that handprint information is to be input in the area inside the engraving.

Here, an engraving is set on an outer wall of the middle frame to indicate an area where the at least one ultrasound handprint sensor acquires the electric signal of the handprint information, facilitating input of the handprint information by the user at the proper location.

As shown in FIG. 4, the at least one ultrasound handprint sensor 12 may include a film handprint sensor. A groove 110 may be set on the inner wall of the middle frame 11. The film handprint sensor may be set inside the groove 110. Accordingly, space available to a device inside UE may be expanded.

The film handprint sensor may be no greater in width than the inner wall of the middle frame where the film handprint sensor is located. It may be preferable that the film handprint sensor has a length that is not too long, to avoid increasing cost, or too short, to avoid difficulty in collecting a handprint. For example, the length of the film handprint sensor may be no less than 15 millimeters and no greater than 120 millimeters.

As shown in FIG. 4, the at least one pressure sensor 13 may include a film pressure sensor. A groove 110 may be set on the inner wall of the middle frame 11. The film handprint sensor and the film pressure sensor may be set inside the groove 110. Accordingly, space available to a device inside UE may be expanded.

The film pressure sensor may be identical in size to the film handprint sensor. The two may overlap completely inside UE. Accordingly, the UE may directly control the ultrasound handprint sensor to collect handprint information of the pressing hand when the pressure detected by the pressure sensor exceeds a preset pressure threshold.

Figure 5:
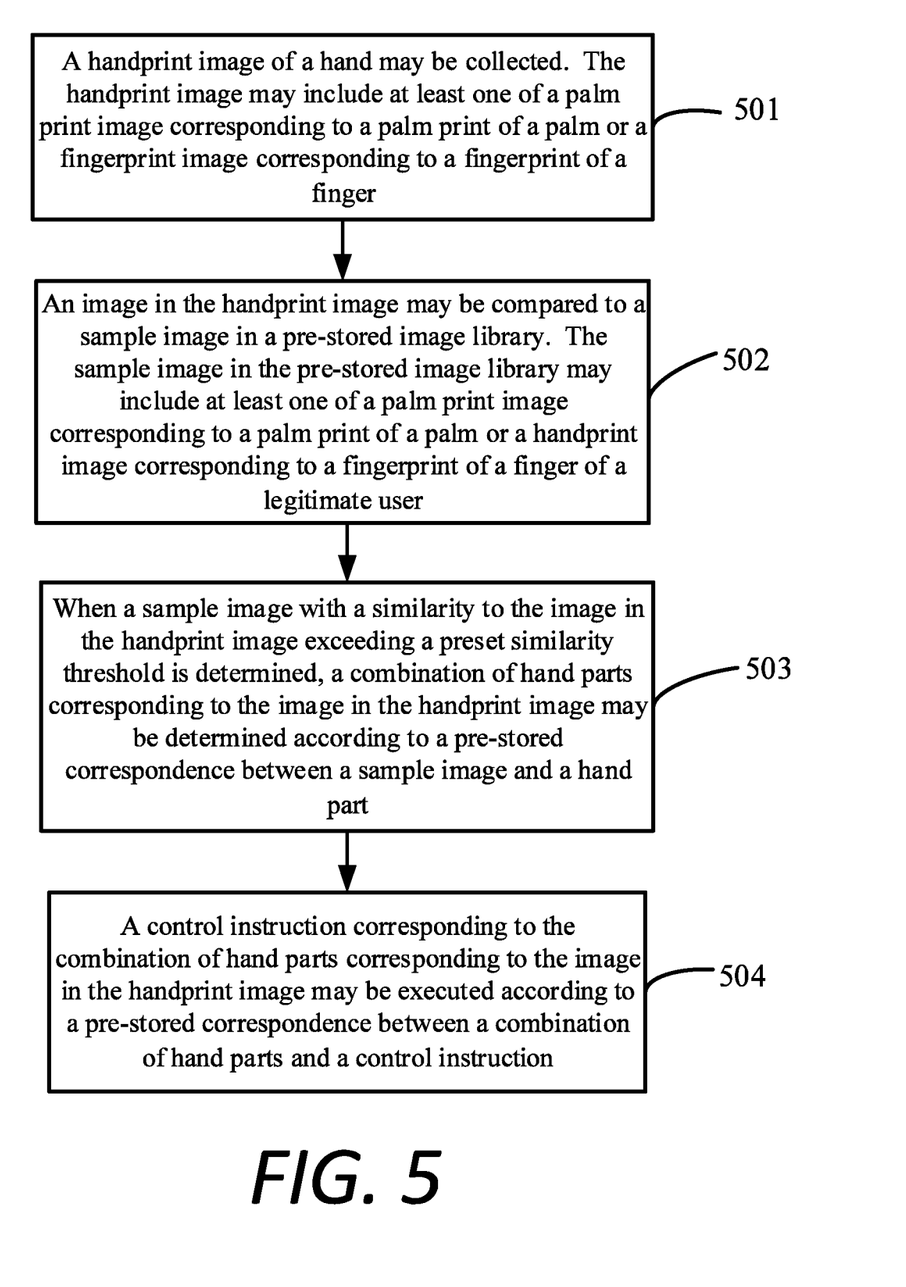
FIG. 5 is a flowchart of a method for identifying a handprint according to an exemplary aspect of the present disclosure.

Aspects herein further provide a method for identifying a handprint. FIG. 5 is a flowchart of a method for identifying a handprint according to an exemplary aspect. The method for identifying a handprint may apply to any aforementioned UE. As shown in FIG. 5, the method for identifying a handprint may include steps 501 to 504 as follows.

In step 501, a handprint image of a hand may be collected. The handprint image may include at least one of a palm print image corresponding to a palm print of a palm or a fingerprint image corresponding to a fingerprint of a finger.

To collect handprint information, UE may control an ultrasound handprint sensor to emit ultrasound capable of passing through the middle frame, receive ultrasound reflected by a hand of a user, and generate an electric signal of handprint information according to the ultrasound reflected. Then, the UE may convert, by a controller, the electric signal of the handprint information collected by the ultrasound handprint sensor into a handprint image. The handprint image acquired by the UE may include at least one of a palm print image corresponding to a palm print of a palm or a fingerprint image corresponding to a fingerprint of a finger. For example, as shown in FIG. 3, when the user holds the UE by one hand, the UE may collect fingerprint images of five fingers and the palm print image of part of the palm print.

In step 502, an image in the handprint image may be compared to a sample image in a pre-stored image library. The sample image in the pre-stored image library may include at least one of a palm print image corresponding to a palm print of a palm or a handprint image corresponding to a fingerprint of a finger of a legitimate user.

UE may collect at least one of a palm print image corresponding to a palm print of a palm or a handprint image corresponding to a fingerprint of a finger of a legitimate user beforehand. Collected images may be pre-stored in an image library as sample images. Having collected the handprint image of a present user, the UE may compare an image in the handprint image to a pre-stored sample image. The UE may compute similarity between an image in the handprint image and a sample image. When similarity between two images exceeds a preset similarity threshold, it may be determined that the two images are identical. If for each image in the handprint image an identical sample image is found, it may be deemed that the handprint image is of a legitimate user. If for one image in the handprint image no identical sample image is found, it may be deemed that the handprint image is not of a legitimate user.

In step 503, when a sample image with a similarity to the image in the handprint image exceeding a preset similarity threshold is determined, a combination of hand parts corresponding to the image in the handprint image may be determined according to a pre-stored correspondence between a sample image and a hand part.

When for each image in the handprint image a sample image with a similarity to the each image exceeding a preset similarity threshold is found, it means for each image in the handprint image an identical sample image is found, and it may be deemed that the handprint image is of a legitimate user. Then, the UE may determine a hand part corresponding to an image in the handprint image to be a hand part corresponding to a sample image identical to the image in the handprint image according to the pre-stored correspondence between a sample image and a hand part. Thus, the combination of hand parts corresponding to the any image in the handprint image may be determined.

In step 504, a control instruction corresponding to the combination of hand parts corresponding to the image in the handprint image may be executed according to a pre-stored correspondence between a combination of hand parts and a control instruction.

A correspondence between a combination of hand parts and a control instruction, default in UE or as set by a user, may be pre-stored inside the UE. Accordingly, having determined a combination of hand parts corresponding to the any image in the handprint image, the UE may directly execute the control instruction corresponding to the combination of hand parts corresponding to the any image in the handprint image according to the correspondence.

For example, it may be pre-stored inside UE that the right hand thumb corresponds to a control instruction for unlocking the UE. It may be pre-stored inside UE that a combination of the right hand thumb and an index finger corresponds to a control instruction for unlocking the UE and taking a photograph. It may be pre-stored inside UE that part of the palm and five fingers of the right hand correspond to a control instruction for unlocking an application A. It may be pre-stored inside UE that the left hand thumb corresponds to a control instruction for recording, etc. Thus, to unlock UE, a user may press a handprint collecting area using the right hand thumb. Having collected a fingerprint image of the right hand thumb of the user, the UE may determine that the fingerprint image is similar to a sample image of the right hand thumb of a legitimate user, and determine a hand part corresponding to the fingerprint image of the user to be the right hand thumb. Accordingly, a UE unlocking instruction may be executed to unlock the UE.

When the UE includes a pressure sensor, the step 501 may be implemented as step A1 to A3 as follows.

In step A1, a pressure applied by a hand of a user on a side wall where an ultrasound handprint sensor corresponding to the pressure sensor is located may be detected via the pressure sensor.

In step A2, the ultrasound handprint sensor may collect an electric signal of handprint information of the hand when the pressure exceeds a preset pressure threshold.

In step A3, the electric signal of the handprint information may be converted into a handprint image.

To prevent a user touch by accident, as shown in FIG. 3, at least one pressure sensor 13 may further be set on UE 1. The at least one pressure sensor 13 may be in a one-to-one correspondence with the at least one ultrasound handprint sensor 12. The at least one pressure sensor may be located between a corresponding ultrasound handprint sensor 12 and the middle frame 11. The at least one pressure sensor may be electrically connected to the controller. The at least one pressure sensor 13 may be arranged for detecting a pressure applied by the hand of the user on a side wall where the corresponding ultrasound handprint sensor 12 is located. Thus, the controller may control, in response to the pressure detected by the at least one pressure sensor 13 exceeding a preset pressure threshold, the corresponding ultrasound handprint sensor 12 corresponding to the at least one pressure sensor 13 to acquire the electric signal of the handprint information. Accordingly, when a user is to input handprint information for unlocking, the user may apply a large force to a side wall where an ultrasound handprint sensor 12 is located. The controller may then control the ultrasound handprint sensor 12 to emit ultrasound to acquire the electric signal of the handprint information. This may prevent a user touch by accident, avoiding emitting ultrasound for acquiring the electric signal of the handprint information when the electric signal is not required.

Here, a pressure applied by a hand of a user on a side wall where an ultrasound handprint sensor corresponding to a pressure sensor is located may be detected by the pressure sensor. When the pressure detected by the pressure sensor exceeds a preset pressure threshold, the ultrasound handprint sensor corresponding to the pressure sensor can be controlled to acquire an electric signal of handprint information, preventing a user touch by accident.

An apparatus herein as follows may be arranged for executing the method herein.

Figure 6:
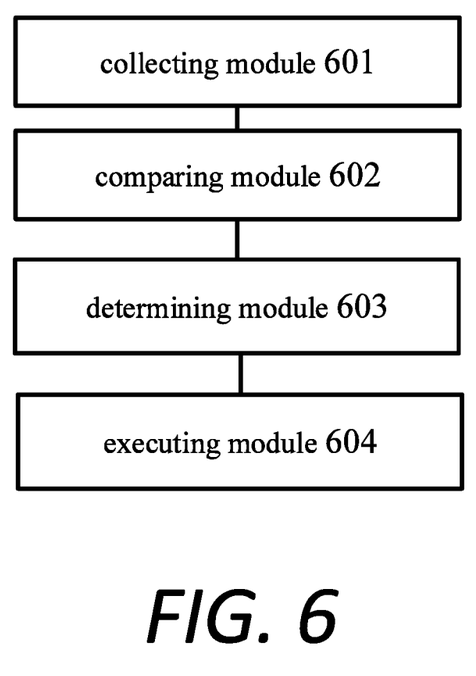
FIG. 6 is a block diagram of an apparatus for identifying a handprint according to an exemplary aspect of the present disclosure.

FIG. 6 is a block diagram of an apparatus for identifying a handprint according to an exemplary aspect, the apparatus may be implemented as part of, or entire, electronic equipment by software, hardware, or a combination of software and hardware. As shown in FIG. 6, the apparatus for identifying a handprint may include a module as follows.

A collecting module 601 may be arranged for collecting a handprint image of a hand. The handprint image may include at least one of a palm print image corresponding to a palm print of a palm or a fingerprint image corresponding to a fingerprint of a finger.

A comparing module 602 may be arranged for comparing an image in the handprint image to a sample image in a pre-stored image library. A sample image in the pre-stored image library may include at least one of a palm print image corresponding to a palm print of a palm or a handprint image corresponding to a fingerprint of a finger of a legitimate user.

A determining module 603 may be arranged for, in response to determining a sample image with a similarity to the image in the handprint image exceeding a preset similarity threshold, determining, according to a pre-stored correspondence between a sample image and a hand part, a combination of hand parts corresponding to the image in the handprint image.

An executing module 604 may be arranged for executing, according to a pre-stored correspondence between a combination of hand parts and a control instruction, a control instruction corresponding to the combination of hand parts corresponding to the image in the handprint image.

Figure 7:
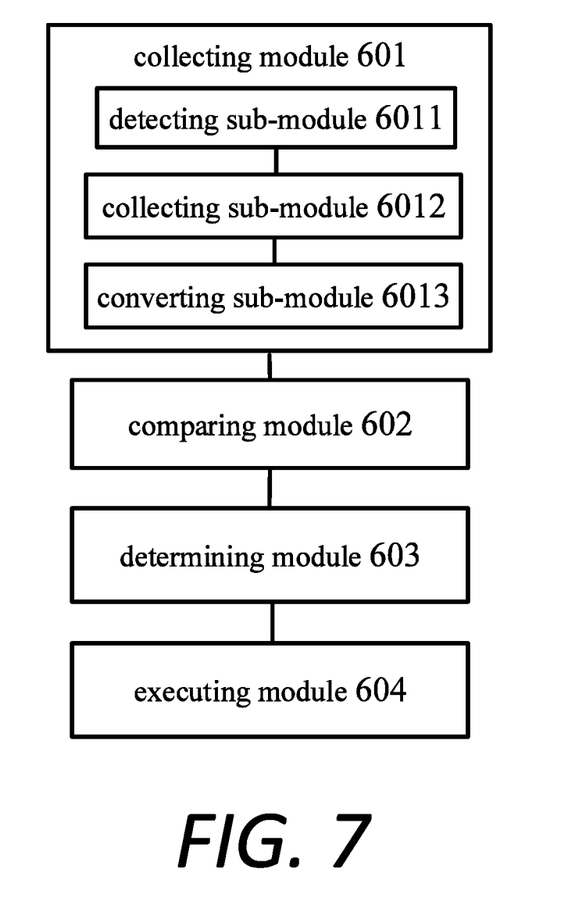
FIG. 7 is a block diagram of an apparatus for identifying a handprint according to an exemplary aspect of the present disclosure.

FIG. 7 is a block diagram of an apparatus for identifying a handprint according to an exemplary aspect. As shown in FIG. 7, the collecting module 601 may include a detecting sub-module 6011, a collecting sub-module 6012, and a converting sub-module 6013.

The detecting sub-module 6011 may be arranged for detecting, via a pressure sensor, a pressure applied by the hand of the user on a side wall where an ultrasound handprint sensor corresponding to the pressure sensor is located.

The collecting sub-module 6012 may be arranged for, in response to the pressure exceeding a preset pressure threshold, collecting, via the ultrasound handprint sensor, the electric signal of the handprint information of the hand.

The converting sub-module 6013 may be arranged for converting the electric signal of the handprint information into the handprint image.

Refer to a method herein for elaboration of how a module of the apparatus executes an operation, which is not repeated here.

Figure 8:
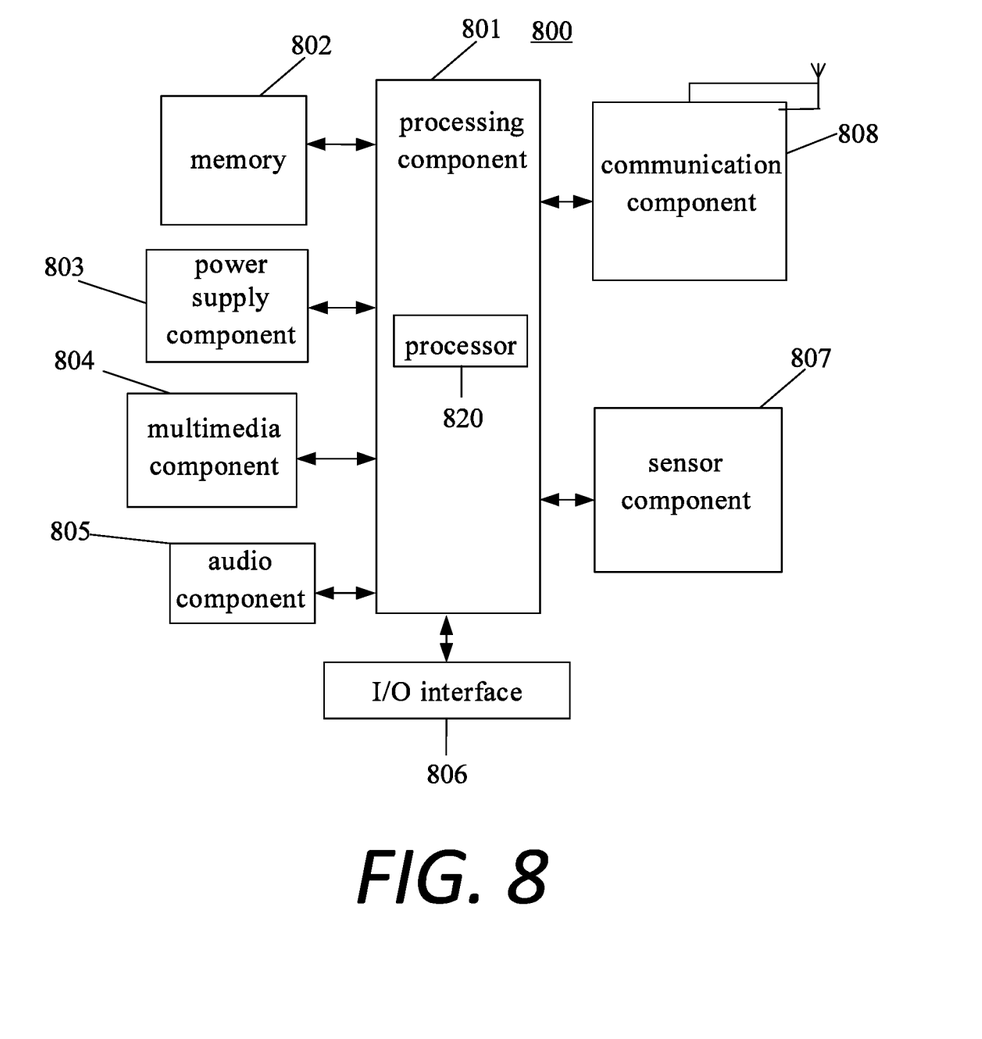
FIG. 8 is a block diagram of an apparatus for identifying a handprint according to an exemplary aspect of the present disclosure.

FIG. 8 is a block diagram of an apparatus applying to UE according to an exemplary aspect. The apparatus may apply to UE. For example, the apparatus 800 may be a mobile phone, a game console, a computer, tablet equipment, a personal digital assistant, etc.

The apparatus 800 may include at least one of a processing component 801, memory 802, a power supply component 803, a multimedia component 804, an audio component 805, an Input/Output (I/O) interface 806, a sensor component 807, or a communication component 808.

The processing component 801 may generally control an overall operation of the apparatus 800, such as operations associated with display, a telephone call, data communication, a camera operation, a recording operation, etc. The processing component 801 may include one or more processors 820 to execute instructions so as to complete all or some steps of the method. In addition, the processing component 801 may include one or more modules to facilitate interaction between the processing component 801 and other components. For example, the processing component 801 may include a multimedia module to facilitate interaction between the multimedia component 804 and the processing component 801.

The memory 802 may be arranged for storing various types of data to support the operation at the apparatus 800. Examples of such data may include instructions of any application or method arranged for operating on the apparatus 800, contact data, phonebook data, messages, pictures, videos, and/or the like. The memory 802 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 803 may supply electric power to various components of the apparatus 800. The power supply component 803 may include a power management system, one or more power sources, and other components related to generating, managing, and distributing electricity for the apparatus 800.

The multimedia component 804 may include a screen that provides an output interface between the apparatus 800 and a user. The screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The one or more touch sensors not only may sense the boundary of a touch or slide move, but also detect the duration and pressure related to the touch or slide move. The multimedia component 804 may include a front camera and/or a rear camera. When the apparatus 800 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 805 may be arranged for outputting and/or inputting an audio signal. For example, the audio component 805 may include a microphone (MIC). When the apparatus 800 is in an operation mode such as a call mode, a recording mode, a voice recognition mode, etc., the MIC may be arranged for receiving an external audio signal. The received audio signal may be further stored in the memory 802 or may be sent via the communication component 808. The audio component 805 may further include a loudspeaker arranged for outputting the audio signal.

The I/O interface 806 may provide an interface between the processing component 801 and a peripheral interface module. Such a peripheral interface module may be a keypad, a click wheel, a button, and/or the like. Such a button may include but is not limited to at least one of: a homepage button, a volume button, a start button, or a lock button.

The sensor component 807 may include one or more sensors for assessing various states of the apparatus 800. For example, the sensor component 807 may detect an on/off state of the apparatus 800 and relative positioning of components such as the display and the keypad of the apparatus 800. The sensor component 807 may further detect a change in the position of the apparatus 800 or of a component of the apparatus 800, whether there is contact between the apparatus 800 and a user, the orientation or acceleration/deceleration of the apparatus 800, a change in the temperature of the apparatus 800, etc. The sensor component 807 may include a proximity sensor arranged for detecting existence of a nearby object without physical contact. The sensor component 807 may further include an ultrasound handprint sensor, a pressure sensor, an optical sensor such as a Complementary Metal-Oxide-Semiconductor (CMOS) or a Charge-Coupled-Device (CCD) image sensor used in an imaging application. In some aspects, the sensor component 807 may further include an acceleration sensor, a gyroscope sensor, a magnetic sensor, a temperature sensor, etc.

The communication component 808 may be arranged for facilitating wired or wireless communication between the apparatus 800 and other equipment. The apparatus 800 may access a wireless network based on a communication standard such as Wi-Fi, 2G, 3G, . . . , or a combination thereof. The communication component 808 may broadcast related information or receive a broadcast signal from an external broadcast management system via a broadcast channel. The communication component 808 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The apparatus 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 802 including instructions, may be provided. The instructions may be executed by the processor 820 of the apparatus 800 to implement the method. For example, the non-transitory computer-readable storage medium may be Read-Only Memory (ROM), Compact Disc Read-Only Memory (CD-ROM), a magnetic tape, a floppy disk, optical data storage equipment, and/or the like.

A non-transitory computer-readable storage medium may include instructions which when executed by the processor of the apparatus 800, may implement the method for identifying a handprint. The method may include steps as follows.

A handprint image of a hand may be collected. The handprint image may include at least one of a palm print image corresponding to a palm print of a palm or a fingerprint image corresponding to a fingerprint of a finger.

An image in the handprint image may be compared to a sample image in a pre-stored image library. The sample image in the pre-stored image library may include at least one of a palm print image corresponding to a palm print of a palm or a handprint image corresponding to a fingerprint of a finger of a legitimate user.

When a sample image with a similarity to the image in the handprint image exceeding a preset similarity threshold is found, a combination of hand parts corresponding to the image in the handprint image may be determined according to a pre-stored correspondence between a sample image and a hand part.

A control instruction corresponding to the combination of hand parts corresponding to the image in the handprint image may be executed according to a pre-stored correspondence between a combination of hand parts and a control instruction.

When the UE includes a pressure sensor, a handprint image of a hand may be collected as follows.

A pressure applied by the hand of the user on a side wall where an ultrasound handprint sensor corresponding to the pressure sensor is located may be detected via the pressure sensor.

The electric signal of the handprint information of the hand may be collected by the ultrasound handprint sensor when the pressure exceeds a preset pressure threshold.

The electric signal of the handprint information may be converted into the handprint image.

Aspects herein further provide an apparatus for identifying a handprint. The apparatus may include a processor and memory for storing instructions executable by the processor.

The processor may be arranged for executing a step as follows.

A handprint image of a hand may be collected. The handprint image may include at least one of a palm print image corresponding to a palm print of a palm or a fingerprint image corresponding to a fingerprint of a finger.

An image in the handprint image may be compared to a sample image in a pre-stored image library. The sample image in the pre-stored image library may include at least one of a palm print image corresponding to a palm print of a palm or a handprint image corresponding to a fingerprint of a finger of a legitimate user.

When a sample image with a similarity to the image in the handprint image exceeding a preset similarity threshold is found, a combination of hand parts corresponding to the image in the handprint image may be determined according to a pre-stored correspondence between a sample image and a hand part.

A control instruction corresponding to the combination of hand parts corresponding to the image in the handprint image may be executed according to a pre-stored correspondence between a combination of hand parts and a control instruction.

When the UE includes a pressure sensor, the processor may further be arranged for collecting a handprint image of a hand as follows.

A pressure applied by the hand of the user on a side wall where an ultrasound handprint sensor corresponding to the pressure sensor is located may be detected via the pressure sensor.

The electric signal of the handprint information of the hand may be collected by the ultrasound handprint sensor when the pressure exceeds a preset pressure threshold.

The electric signal of the handprint information may be converted into the handprint image.

The processor may be a Central Processing Unit (CPU), a general purpose processor, a Digital Signal Processor (DSP), an Application Specific Integrated Circuit (ASIC), and/or the like. A general purpose processor may be a microprocessor, any conventional processor, and/or the like.

Aforementioned memory may be a Read-Only Memory (ROM), a Random Access Memory (RAM), a flash memory, a hard disk, a solid state disk, and/or the like. A Subscriber Identity Module (SIM) card, also referred to as a smart card, may have to be installed on a digital mobile phone before the phone can be used. Content, such as information on a user of the digital mobile phone, an encryption key, a phonebook of the user, may be stored on the computer chip. A step of the method according to any combination of aspects herein may be executed by a hardware processor, or by a combination of hardware and software modules in the processor.

Herein by "multiple", it may mean two or more. A term "and/or" may describe an association between associated objects, including three possible relationships. For example, by A and/or B, it may mean that there may be three cases, namely, existence of but A, existence of both A and B, or existence of but B. A slash mark "/" may generally denote an "or" relationship between two associated objects that come respectively before and after the mark per se.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A user equipment, comprising:
a housing including a front housing, a rear housing, and a middle frame located between the front housing and the rear housing;
at least one ultrasound handprint sensor located on an inner wall of the middle frame, and configured to emit an ultrasound capable of passing through the middle frame, receive an ultrasound reflected by a hand of a user, and generate an electric signal of handprint information based on the ultrasound reflected by the hand of the user; and
a controller located inside the housing, electrically connected to the at least one ultrasound handprint sensor, and configured to control the at least one ultrasound handprint sensor, and convert the electric signal of the handprint information collected by the at least one ultrasound handprint sensor into a handprint image,
wherein the at least one ultrasound handprint sensor includes a film handprint sensor, wherein the inner wall of the middle frame includes a groove, and wherein the film handprint sensor is disposed inside the groove.

2. The user equipment of claim 1, further comprising:
at least one pressure sensor, in a one-to-one correspondence with the at least one ultrasound handprint sensor, located between a corresponding ultrasound handprint sensor and the middle frame, electrically connected to the controller, and configured to detect a pressure applied by the hand of the user on a side wall where the corresponding ultrasound handprint sensor is located,
wherein the controller is further configured to control, in response to the pressure detected by the at least one pressure sensor exceeding a preset pressure threshold, the corresponding ultrasound handprint sensor corresponding to the at least one pressure sensor to acquire the electric signal of the handprint information.

3. The user equipment of claim 1,
wherein the at least one ultrasound handprint sensor includes two ultrasound handprint sensors located respectively on two opposite inner walls of the middle frame.

4. The user equipment of claim 2, further comprising:
a flexible board connecting the controller to the at least one ultrasound handprint sensor, and connecting the at least one pressure sensor to the controller.

5. The user equipment of claim 1, wherein an outer wall of the middle frame includes an engraving that indicates an area where the at least one ultrasound handprint sensor acquires the electric signal of the handprint information.

6. The user equipment of claim 2, wherein the at least one pressure sensor includes a film pressure sensor, wherein the inner wall of the middle frame includes a groove, wherein a film handprint sensor and the film pressure sensor are disposed inside the groove, and wherein the film pressure sensor is identical in size to the film handprint sensor.

7. A method for identifying a handprint, applied to a user equipment, the method comprising:
collecting a handprint image of a hand, the handprint image including at least one of a palm print image corresponding to a palm print of a palm or a fingerprint image corresponding to a fingerprint of a finger;
comparing an image in the handprint image to a sample image in a pre-stored image library, the sample image in the pre-stored image library including at least one of a palm print image corresponding to a palm print of a palm or a fingerprint image corresponding to a fingerprint of a finger of a legitimate user;
in response to determining a sample image with a similarity to the image in the handprint image exceeding a preset similarity threshold, determining, based on a pre-stored correspondence between a sample image and a hand part, a combination of hand parts corresponding to the image in the handprint image; and
executing, based on a pre-stored correspondence between a combination of hand parts and a control instruction, a control instruction corresponding to the combination of hand parts corresponding to the image in the handprint image,
wherein the user equipment comprises:
a housing including a front housing, a rear housing, and a middle frame located between the front housing and the rear housing;
at least one ultrasound handprint sensor located on an inner wall of the middle frame, and configured to emit an ultrasound capable of passing through the middle frame, receive an ultrasound reflected by a hand of a user, and generate an electric signal of handprint information based on the ultrasound reflected by the hand of the user; and
a controller located inside the housing, electrically connected to the at least one ultrasound handprint sensor, and configured to control the at least one ultrasound handprint sensor, and convert the electric signal of the handprint information collected by the at least one ultrasound handprint sensor into a handprint image,
wherein the at least one ultrasound handprint sensor includes a film handprint sensor, wherein the inner wall of the middle frame includes a groove, and wherein the film handprint sensor is disposed inside the groove.

8. The method of claim 7, wherein collecting the handprint image of the hand comprises:
detecting, via a pressure sensor in the user equipment, a pressure applied by the hand of the user on a side wall where an ultrasound handprint sensor corresponding to the pressure sensor is located;
in response to the pressure exceeding a preset pressure threshold, collecting, by the ultrasound handprint sensor, an electric signal of handprint information of the hand; and
converting the electric signal of the handprint information into the handprint image.

9. An apparatus for identifying a handprint, applied to a user equipment, the apparatus comprising:
a processor; and
a memory for storing instructions executable by the processor,
wherein the processor is configured to:
collect a handprint image of a hand, the handprint image including at least one of a palm print image corresponding to a palm print of a palm or a fingerprint image corresponding to a fingerprint of a finger;
compare an image in the handprint image to a sample image in a pre-stored image library, the sample image in the pre-stored image library including at least one of a palm print image corresponding to a palm print of a palm or a fingerprint image corresponding to a fingerprint of a finger of a legitimate user;
in response to determining a sample image with a similarity to the image in the handprint image exceeding a preset similarity threshold, determine, based on a pre-stored correspondence between a sample image and a hand part, a combination of hand parts corresponding to the image in the handprint image; and
execute, based on a pre-stored correspondence between a combination of hand parts and a control instruction, a control instruction corresponding to the combination of hand parts corresponding to the image in the handprint image,
wherein the user equipment comprises:
a housing including a front housing, a rear housing, and a middle frame located between the front housing and the rear housing;
at least one ultrasound handprint sensor located on an inner wall of the middle frame, and configured to emit an ultrasound capable of passing through the middle frame, receive an ultrasound reflected by a hand of a user, and generate an electric signal of handprint information based on the ultrasound reflected by the hand of the user; and
a controller located inside the housing, electrically connected to the at least one ultrasound handprint sensor, and configured to control the at least one ultrasound handprint sensor, and convert the electric signal of the handprint information collected by the at least one ultrasound handprint sensor into a handprint image, wherein the at least one ultrasound handprint sensor includes a film handprint sensor, wherein the inner wall of the middle frame includes a groove, and wherein the film handprint sensor is disposed inside the groove.

10. The apparatus of claim 9, wherein when collecting the handprint image of the hand, the processor is further configured to:

detect, via a pressure sensor in the user equipment, a pressure applied by the hand of the user on a side wall where an ultrasound handprint sensor corresponding to the pressure sensor is located;

in response to the pressure exceeding a preset pressure threshold, collect, by the ultrasound handprint sensor, an electric signal of handprint information of the hand; and convert the electric signal of the handprint information into the handprint image.

11. A non-transitory computer-readable storage medium having stored thereon instructions that, when executed by at least one processor, cause the at least one processor to implement the method of claim 7.

* * * * *